(12) United States Patent
Kruglick

(10) Patent No.: US 9,648,123 B2
(45) Date of Patent: May 9, 2017

(54) DISTRIBUTING CONTENT ELEMENTS AMONG DEVICES

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 161 days.

(21) Appl. No.: 13/988,417

(22) PCT Filed: Dec. 17, 2012

(86) PCT No.: PCT/US2012/070157
§ 371 (c)(1),
(2) Date: May 20, 2013

(87) PCT Pub. No.: WO2014/098795
PCT Pub. Date: Jun. 26, 2014

(65) Prior Publication Data
US 2014/0173032 A1    Jun. 19, 2014

(51) Int. Cl.
| G06F 15/16 | (2006.01) |
| H04L 29/08 | (2006.01) |
| G06F 17/30 | (2006.01) |

(52) U.S. Cl.
CPC ...... H04L 67/2823 (2013.01); H04L 67/2814 (2013.01); *G06F 17/30896* (2013.01); *G06F 17/30905* (2013.01)

(58) Field of Classification Search
CPC .............. H04L 67/2828; H04L 67/2823; G06F 17/30905; G06F 17/30896

USPC ............ 370/328; 707/8, 200; 709/204, 217; 715/753, 760
See application file for complete search history.

(56) References Cited

U.S. PATENT DOCUMENTS

| 7,487,454 B2 | 2/2009 | Czerwinski et al. |
| 7,647,614 B2 * | 1/2010 | Krikorian et al. ............. 725/94 |
| 7,865,928 B2 | 1/2011 | Hostyn et al. |
| 8,537,753 B2 | 9/2013 | Klein |
| 8,752,199 B2 * | 6/2014 | Mallinson ...................... 726/28 |
| 8,977,653 B1 * | 3/2015 | Mahkovec ........ G06F 17/30899 707/769 |

(Continued)

OTHER PUBLICATIONS

International Search Report and The Written Opinion of the International Searching Authority, mailed on Mar. 1, 2013.

(Continued)

*Primary Examiner* — Joseph E Avellino
*Assistant Examiner* — Patrick Ngankam
(74) *Attorney, Agent, or Firm* — Turk IP Law, LLC

(57) ABSTRACT

Technologies are generally described for distributing displayed content elements among devices. In some examples, a system for moving and redistributing controls or other elements among web capable devices is presented using gateway managed redirection and injection of web page code. Injection capabilities of advertising gateways may be managed with a web application type interface for allowing a user to instruct the gateway to copy elements out of the web interface on one device and inject the elements into the interface on another device. Thus, transport of control or other elements may be enabled as suitable for various device capabilities.

23 Claims, 7 Drawing Sheets

(56) References Cited

U.S. PATENT DOCUMENTS

| | | | |
|---|---|---|---|
| 2008/0140728 A1 | 6/2008 | Fraser et al. | |
| 2009/0219437 A1* | 9/2009 | Baugher et al. | 348/385.1 |
| 2010/0037150 A1* | 2/2010 | Sawant | 715/753 |
| 2010/0050269 A1* | 2/2010 | Odaka | G11B 27/034 |
| | | | 726/27 |
| 2013/0047077 A1* | 2/2013 | Vick | G06F 17/272 |
| | | | 715/237 |
| 2014/0053054 A1* | 2/2014 | Shen | G06F 17/30905 |
| | | | 715/234 |

OTHER PUBLICATIONS

Biggs, "Now You Know: Hotels Inject Banner Ads Into The Wi-Fi They Charge You For": http://techcrunch.com/2012/04/06/now-you-know-hotels-inject-banner-ads-into-the-wi-fi-they-charge-you-for/, Tech Crunch, Apr. 6, 2012.

"RGnets RXG-A8 rXg Revenue Extraction Hotspot Gateway for Hotel and WISP, 500 User": http://www.wlanmall.com/rxg-a8-revenue-extraction-hotspot-gateway-for-hotel-and-wisp-1000-user.html, WlanMall, Copyright 2013.

RGNets; http://rgnets.com/, Copyright 2004-2013, RG Nets, Inc.

Richardson et al., "Beautiful Soup"; http://www.crummy.com/software/BeautifulSoup/, Crummy.com, Last modified on May 14, 2013.

"WebKit"; http://en.wikipedia.org/wiki/WebKit , Wikipedia, Last modified on May 7, 2013.

Tan et al., "WinCuts: Manipulating Arbitrary Window Regions for More Effective Use of Screen Space", in CHI EA '04, Apr. 2004.

Coldewey et al.,"Marriott Puts an End to Shady Ad injection Service", Tech Crunch, Apr. 9, 2012.

\* cited by examiner

DISTRIBUTING CONTENT ELEMENTS AMONG DEVICES

CROSS-REFERENCE TO RELATED APPLICATION

This Application is the U.S. National Stage filing under 35 U.S.C. §371 of International Application No. PCT/US12/70157 filed on Dec. 17, 2012. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

As computing devices and platforms proliferate, individual users may find themselves using multiple computing devices and platforms to accomplish tasks, sometimes simultaneously. For example, a user may have available a desktop computer, a laptop computer, a tablet computer, and/or a smart phone, and may use one or more of the different devices to perform a task. In some situations, a user may wish to move or duplicate one or more user interface controls from one device to another. Current methods for doing so may involve setting up dedicated programs on both devices, resulting in high complexity, and further may not be easily achievable on some simpler consumer platforms, such as televisions or thin clients.

SUMMARY

The present disclosure generally describes techniques for distributing content elements among devices.

According to some examples, a method is provided for distributing content elements among devices. The method may include receiving first and second content, receiving an indication of a selection of a content element in the first content from a first device, inserting the selected content element into the second content, and providing the second content having the selected content element to be rendered through a second device.

According to other examples, a system is provided for distributing content elements among devices. The system may include a gateway and a renderer. The gateway may be configured to receive first and second content, receive an indication of a selection of a content element in the first content from a first device, insert the selected content element into the second content, and provide the second content having the selected content element. The renderer may be part of the second device and configured to receive the second content having the selected content element and render the received second content on a second device.

According to further examples, a gateway is provided for distributing content elements among devices. The gateway may include a communication module and a processor. The processor may be configured to receive first and second content, receive an indication of a selection of a content element in the first content from a first device, add the selected content element into the second content, and provide the second content having the selected content element to be rendered through a second device.

According to some examples, a computer readable medium may store instructions for distributing content elements among devices. The instructions may include receiving first and second content, receiving an indication of a selection of a content element in the first content from a first device, inserting the selected content element into the second content, and providing the second content having the selected content element to be rendered through a second device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
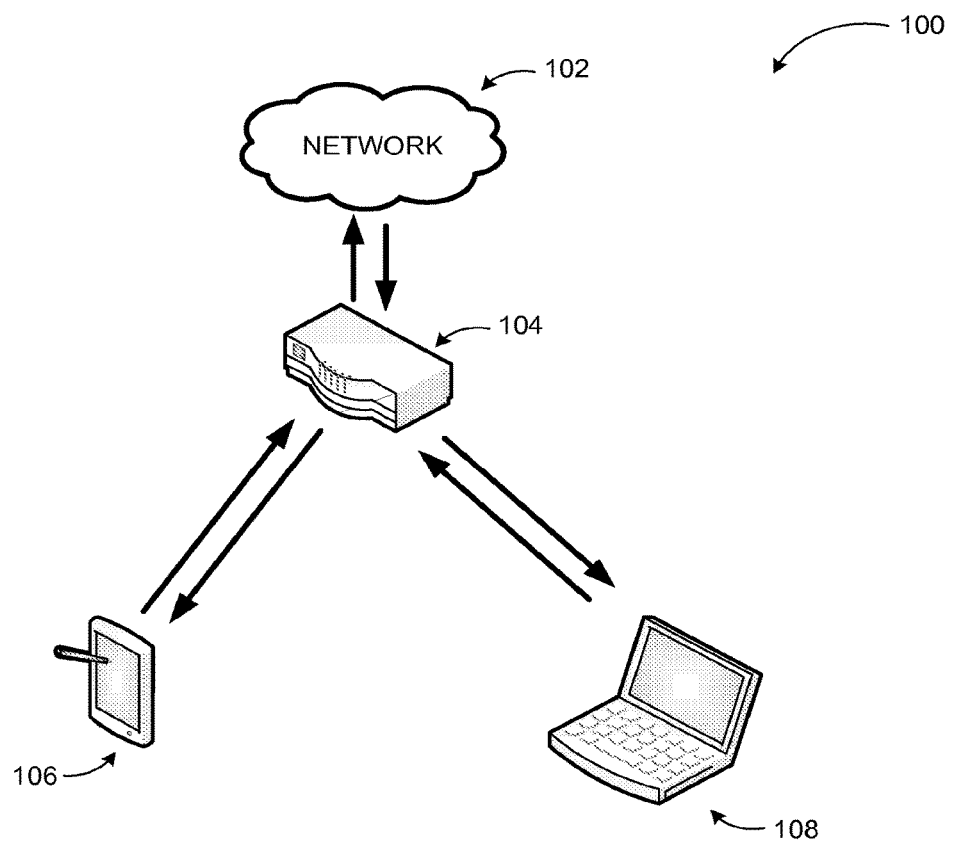
FIG. 1 illustrates an example system for routing content to different devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to distributing content elements among devices.

Briefly stated, technologies are generally described for distributing displayed content elements among devices. In some examples, a system for moving and redistributing controls or other elements among web capable devices is presented using gateway managed redirection and injection of web page code. Injection capabilities of advertising gateways may be managed with a web application type interface for allowing a user to instruct the gateway to copy elements out of the web interface on one device and inject the elements into the interface on another device. Thus, transport of control or other elements may be enabled as suitable for various device capabilities.

FIG. 1 illustrates an example system for routing content to different devices, arranged in accordance with at least some embodiments described herein.

As shown in a diagram 100, a system for routing content to different devices may include a gateway 104 configured to route network traffic between one or more user devices and a network 102 (e.g., the Internet). For example, a first user device 106 and/or a second user device 108 may couple to and request content from the network 102 via one or more requests sent through the gateway 104. The gateway 104 may be a home router, a facility network hub, or an Internet service provider (ISP) server. The first user device 106 and/or the second user device 108 may be a smartphone or a tablet, laptop, mobile, handheld, desktop, or wearable computer, or any other suitable computing device. In some embodiments, the first user device 106 and/or the second user device 108 may be a television, a wall display, a projector, a standalone monitor, or any other device that has a display. In such cases, the system may also include a renderer (not shown) for rendering content on the first user device 106 and/or the second user device 108. The renderer may be part of the first and second device, respectively.

The first user device 106 and/or the second user device 108 may connect to the gateway 104 via a wired connection (e.g., Ethernet, USB, or any other suitable wired connection) or wirelessly (e.g., WiFi, Bluetooth, cellular, or any other suitable wireless connection) in order to communicate with other devices, computers, or servers over the network 102. The connection to the gateway 104 may be established through a discovery process. For example, the gateway 104 may advertise itself as the connection point for the network 102 and allow user devices to establish connection with the network 102 following a handshake/authentication protocol.

Upon receiving a content request, one or more devices, computers, or servers coupled to the network 102 may respond by transmitting the requested content to the gateway 104, which may then forward the content to the requesting user device. The communication between user devices and any other devices on the network 102 may use standard (e.g., hypertext transfer protocol or HTTP) or proprietary communication protocols.

Figure 2:
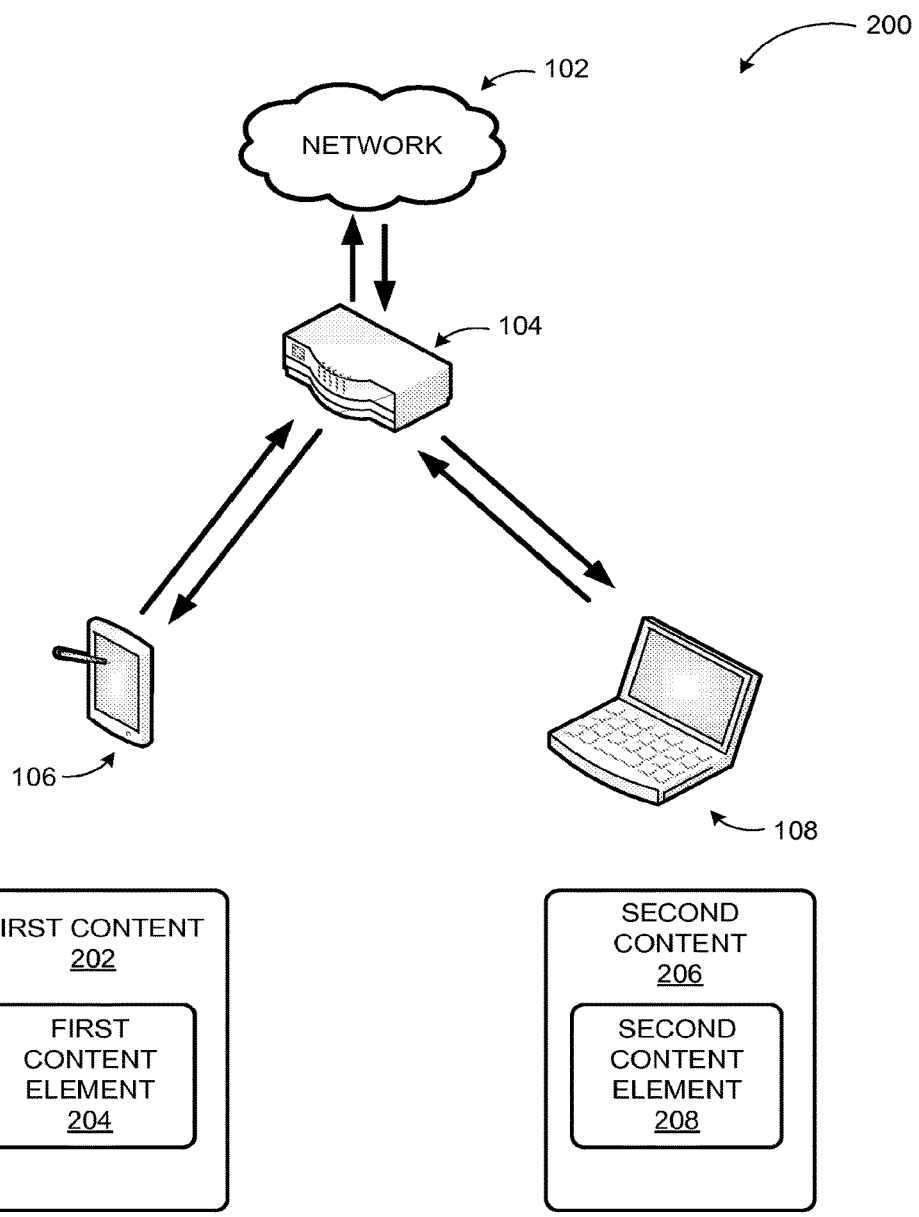
FIG. 2 illustrates an example system for routing content to different devices, where the devices display content with different user interface content elements.

FIG. 2 illustrates an example system for routing content to different devices, where the devices display content with different content elements, arranged in accordance with at least some embodiments described herein.

FIG. 2 depicts a diagram 200 substantially similar to the diagram 100 in FIG. 1, with similarly-numbered elements behaving similarly. In the diagram 200, the first user device 106 may have requested a first content 202, and the second user device 108 may have requested a second content 206. When the first user device 106 displays the first content 202, a first content element 204 may also be displayed with the first content 202. In some embodiments, the first content element 204 (or information for a device to generate the first content element 204) may have been transmitted to the first user device 106 along with the first content 202. A content element, as used herein, may refer to media, graphics, various content elements (control elements), and similar ones. In some example embodiments, the first content element 204 may be a button, a slider, a toggle, an input field, a scroll bar, a hyperlink, a menu, a textbox, a spinner, a radio button, a checkbox, an edit surface, or any other suitable control. The first content element 204 may also include media or graphics not related to controlling a user interface functionality. Similarly, a second content element 208 (or information regarding the element) may be included in or transmitted with the second content 206, and the second user device 108 may display the second content 206 with the second content element 208.

A result of activation of the second content element 208 may be rendered on the first user device 106 and/or the second user device 108 according to some examples. For example, following presentation of the second content element 208 on the second user device 108, the control may be activated and resulting content may be rendered as a result of the activation. The resulting content may be displayed on the first user device 106, on the second user device 108, or on both devices depending on a default parameter maintained by the gateway 104, a user preference, and/or a content source parameter (e.g., some web content sources may place limitations on presentation of content). The resulting content may be new content or previously displayed content (e.g., re-display of a web page on the first and/or second user device upon activation of a "back" button, which has been moved to the second user device 108).

In an example scenario, the first content 202 displayed on the first user device 106 may be a web page and include a video content element. The gateway 104 may move the video content element to the second user device 108 when delivering portions of the web page (or the entire web page) to the first and second user devices 106 and 108. Upon activation of the video content element on the second user device 108, the gateway 104 may direct streaming video to the first user device 106, the second user device 108, or to both user devices depending on the parameters discussed above. Similar rendering of results may be applied to a content element left on the first user device 106 as well.

As described above, in some situations a user may wish to move or duplicate user interface controls from one computing device to another, without having to install dedicated programs on both devices. In some embodiments, this may be accomplished by using gateway-managed redirection and insertion of content source.

Figure 3:
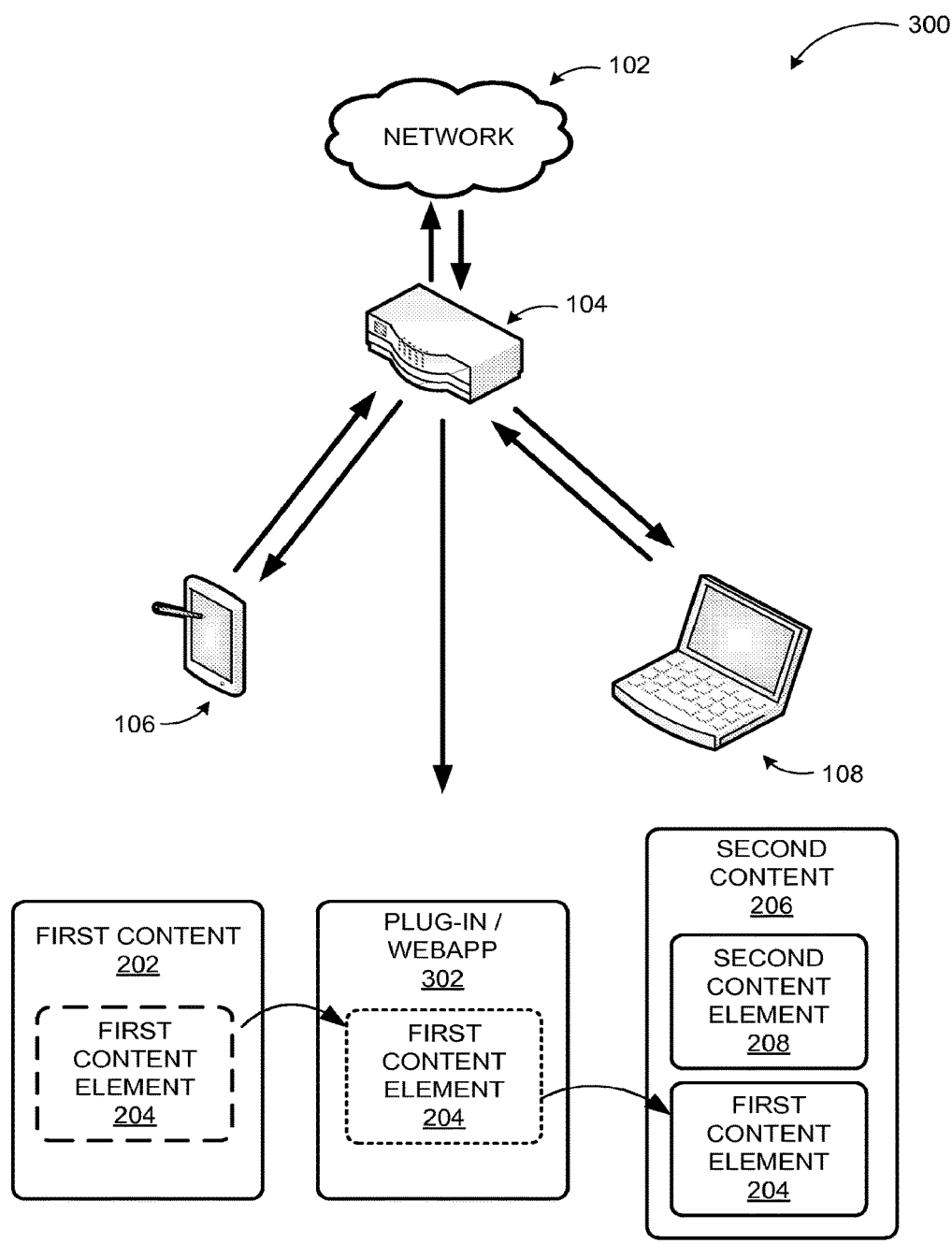
FIG. 3 illustrates another example system for distributing user interface content elements between different devices.

FIG. 3 illustrates another example system for distributing user interface content elements between different devices, arranged in accordance with at least some embodiments described herein.

FIG. 3 depicts a diagram 300 substantially similar to the diagram 200 in FIG. 2, with similarly-numbered elements behaving similarly. In the diagram 300, the gateway 104 may provide an application 302 to allow a user to select one or more content elements displayed with content on a device for display with content on one or more other devices. For example, as in the diagram 200, the first user device 106 may display the requested first content 202 with the first content element 204. A user may be able to use the application 302 to select the first content element 204 displayed on the first user device 106. The user may then direct the application 302 to have the selected first content element 204 displayed along with the second content 206 on the second user device 108. In response, the gateway 104 may extract the first content element 204 from the first content 202 and insert the extracted first content element 204 into the second content 206. The gateway 104 may then provide the second content 206 with the second content element 208 and the inserted first content element 204 to the second user device 108 for display.

In some embodiments, the gateway 104 may provide the application 302 as a web application, a plug-in, or a web page. The gateway 104 may provide the application 302 to the first user device 106 and/or the second user device 108. For example, the gateway 104 may provide the application 302 to a device (e.g., the first user device 106) for selecting content elements displayed on that device (e.g., the first content element 204) or another device (e.g., the second content element 208). The application 302/gateway 104 may also be configured to remove a selected content element. For example, the gateway 104 may be configured to remove the selected first content element 204 from the first content 202, regardless of whether the selected first content element 204 is to be inserted into the second content 206 or not. In some embodiments, the gateway 104 may be configured to maintain a single session with content sources on the network 102, such that a content source sees the gateway 104 as a single user even if different portions of the received content are displayed on different devices.

While only two user devices are depicted in the diagrams 100, 200, and 300, in some embodiments more or fewer devices may request and display content. Similarly, while only two content elements are depicted above, in other embodiments more or fewer content elements may be included in content to be displayed. For example, a user device may display content that includes three or more content elements. Similarly, in some embodiments the gateway 104 may be configured to insert a selected content element into the content displayed on multiple devices.

Figure 4:
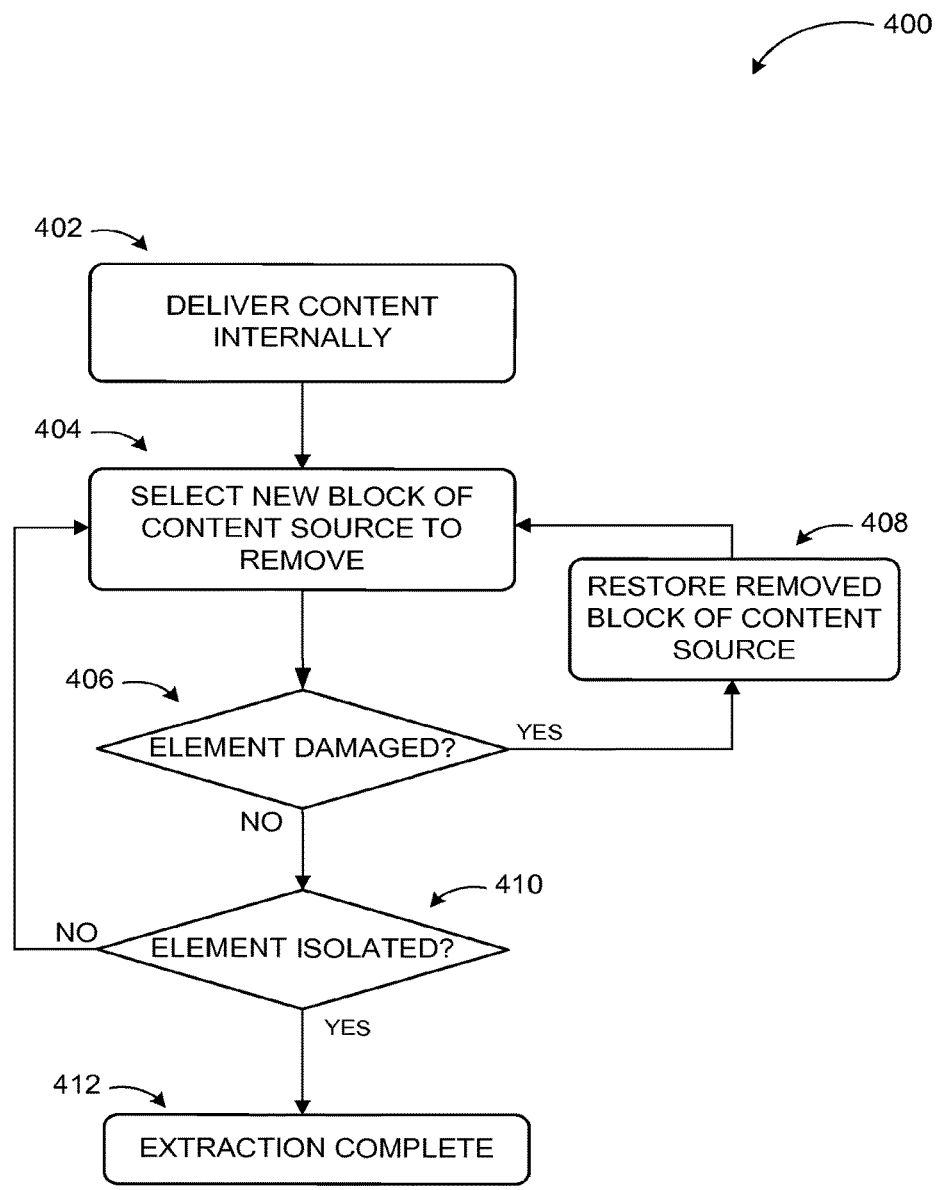
FIG. 4 illustrates an example process for extracting a user interface content element.

FIG. 4 illustrates an example process for extracting a user interface content element, arranged in accordance with at least some embodiments described herein.

As described above, content elements present in a first content (e.g., the first content 202) may be extracted for insertion into other content. In order to extract the content elements, it may be desirable to isolate the portion(s) of the first content associated with the content elements.

As depicted in a diagram 400, a process for extracting a user interface content element may begin with a block 402, where content may be delivered internally by, for example, the gateway 104. The content may include web or network content (e.g., a webpage) received from a network (e.g., the network 102), such as the first content 202 and the second content 206. The content may include one or more content elements, such as the first content element 204 or the second content element 208. In some embodiments, one or more of these content elements have been selected for extraction (e.g., via the application 302).

In a block 404, a new, previously-unselected portion of content source may be selected for removal. For example, if the content is a webpage, a portion of webpage source code (e.g., JavaScript, hypertext markup language or HTML, or any other code) may be selected for removal. In some embodiments, the selection may be performed by decomposing the content into a hierarchical tree, where each portion of the tree may correspond to particular content source portions. Individual portions of the tree may have predicted impacts on the desired content elements if removed, and the selection may be based on an iterative search through the tree. In some embodiments, each content source portion may be associated with a probability of need (i.e., the probability that the portion is required for the desired content elements) and/or a priority of removal (i.e., how important it is that the portion is removed to isolate the desired content elements).

Once a portion of content source has been removed, the content may be re-rendered, and in a block 406 it may be determined if the content element selected for extraction has been damaged. For example, it may be determined if the appearance and/or functionality associated with the selected content element has been altered. If the content element has been damaged, presumably by the removal of the portion of content source, in a block 408 the removed portion of content source may be restored, and a new, previously-unselected portion of content source may be selected for removal in the block 404.

On the other hand, if the content element selected for extraction has not been damaged, in a block 410 it may be determined whether the content element is sufficiently isolated. For example, it may be determined whether other rendered elements or content still appear. If the content element is not sufficiently isolated, another previously-unselected portion of content source may be selected for removal in the block 404. However, if the content element has been sufficiently isolated, the extraction process may complete in a block 412.

Figure 5:
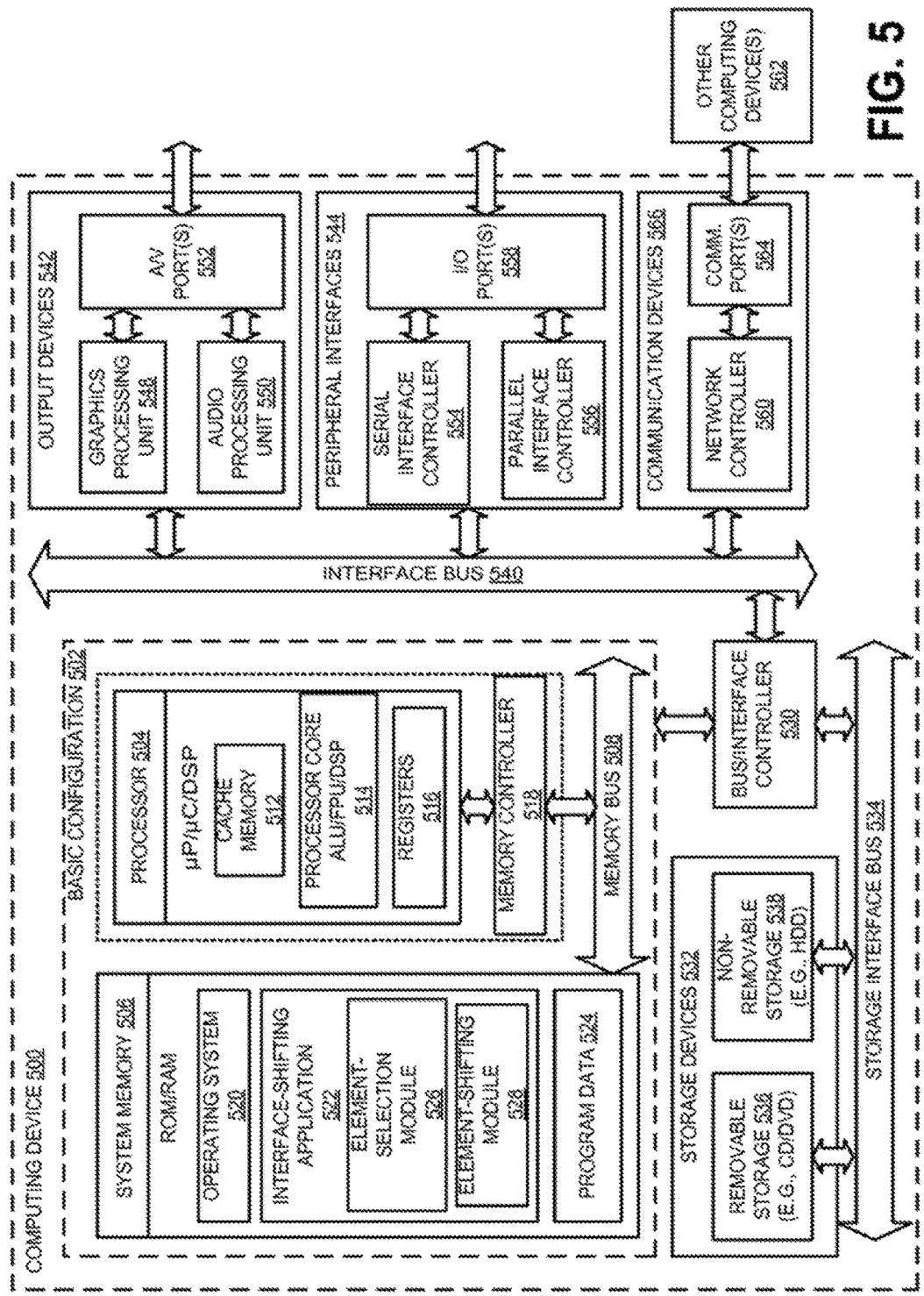
FIG. 5 illustrates a general purpose computing device, which may be used to shift content elements among devices.

FIG. 5 illustrates a general purpose computing device, which may be used to shift content elements among devices, arranged in accordance with at least some embodiments described herein.

For example, the computing device 500 may be used to shift content elements among devices as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some examples the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an interface-shifting application 522, and program data 524. The interface-shifting application 522 may include an element-selection module 526 and an element-shifting module 528 for shifting content elements among devices as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for shifting content elements among devices. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
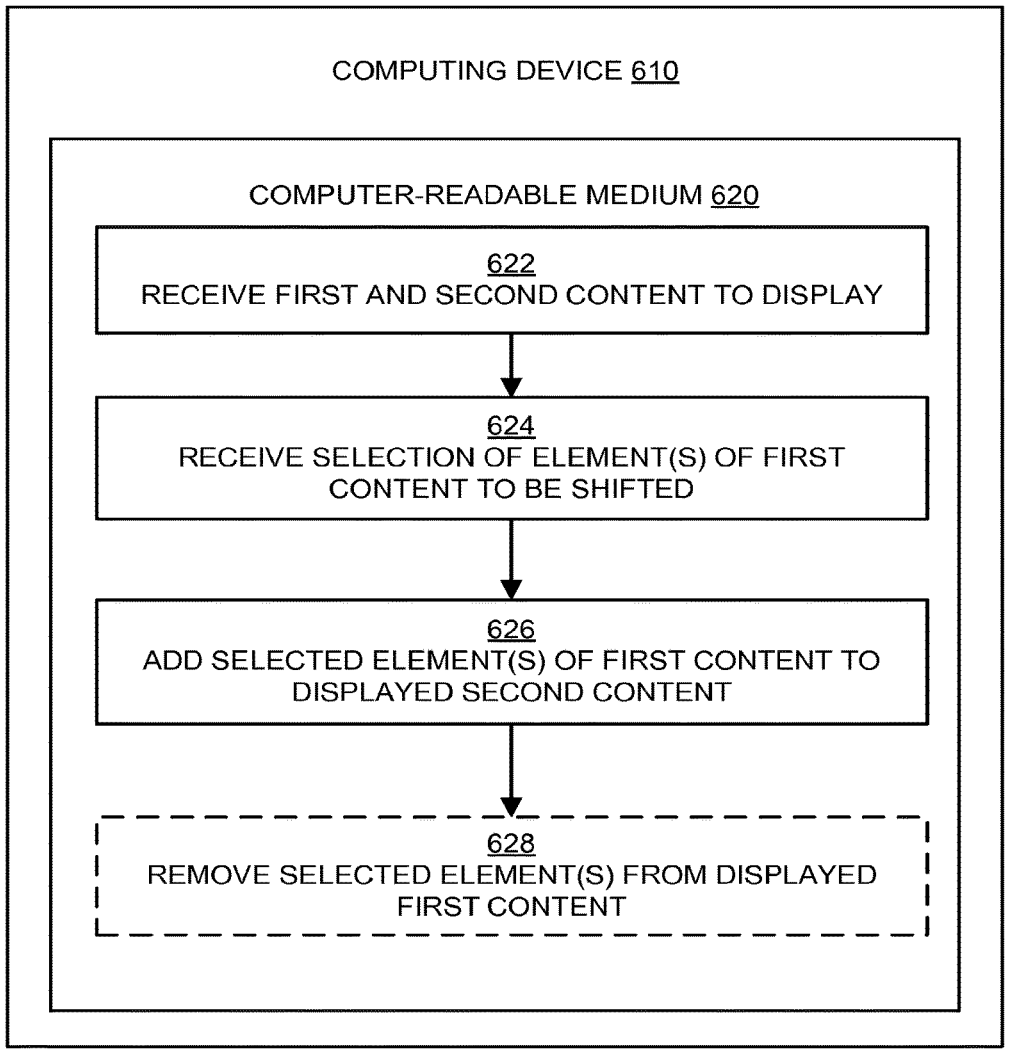
FIG. 6 is a flow diagram illustrating an example method for distributing content elements among devices that may be performed by a computing device such as the computing device in FIG. 5.

FIG. 6 is a flow diagram illustrating an example method for distributing content elements among devices that may be performed by a computing device such as the computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for shifting content elements among devices may begin with block 622, "RECEIVE FIRST AND SECOND CONTENT TO DISPLAY", where first and second content (e.g., the first content 202 and the second content 206) may be received for display. In some embodiments, a gateway (e.g., the gateway 104) may receive the content and transmit the content to user devices (e.g., the first user device 106 and/or the second user device 108) for display. The content may be web-based or network content, and may be received from one or more devices connected to a network (e.g., the network 102) in response to requests from user devices. The received content may include one or more user interface content elements (e.g., the first content element 204 and the second content element 208) and/or information for user devices to generate user interface content elements.

Block 622 may be followed by block 624, "RECEIVE SELECTION OF ELEMENT(S) OF FIRST CONTENT TO BE SHIFTED", where one or more user interface content elements associated with the first content may be selected for shifting. In some embodiments, a gateway (e.g., the gateway 104) may provide an application (e.g., the application 302) for a user to select the one or more user interface content elements. The gateway may provide the application on a first user device displaying the first content (e.g., the first user device 106), on a second user device displaying the second content (e.g., the second user device 108), or both. In other embodiments, the application 302 may select the elements automatically.

Block 624 may be followed by block 626, "ADD SELECTED ELEMENT(S) OF FIRST CONTENT TO DISPLAYED SECOND CONTENT", where the user interface content elements selected in block 624 may be isolated (e.g., as described above in FIG. 4) and inserted into the second content displayed on the second user device by the application 302.

In some embodiments block 626 may be followed by optional block 628, "REMOVE SELECTED ELEMENT(S) FROM DISPLAYED FIRST CONTENT", where the user interface content elements selected in block 624 may be removed by the application 302 from the first content displayed on the first user device.

Figure 7:
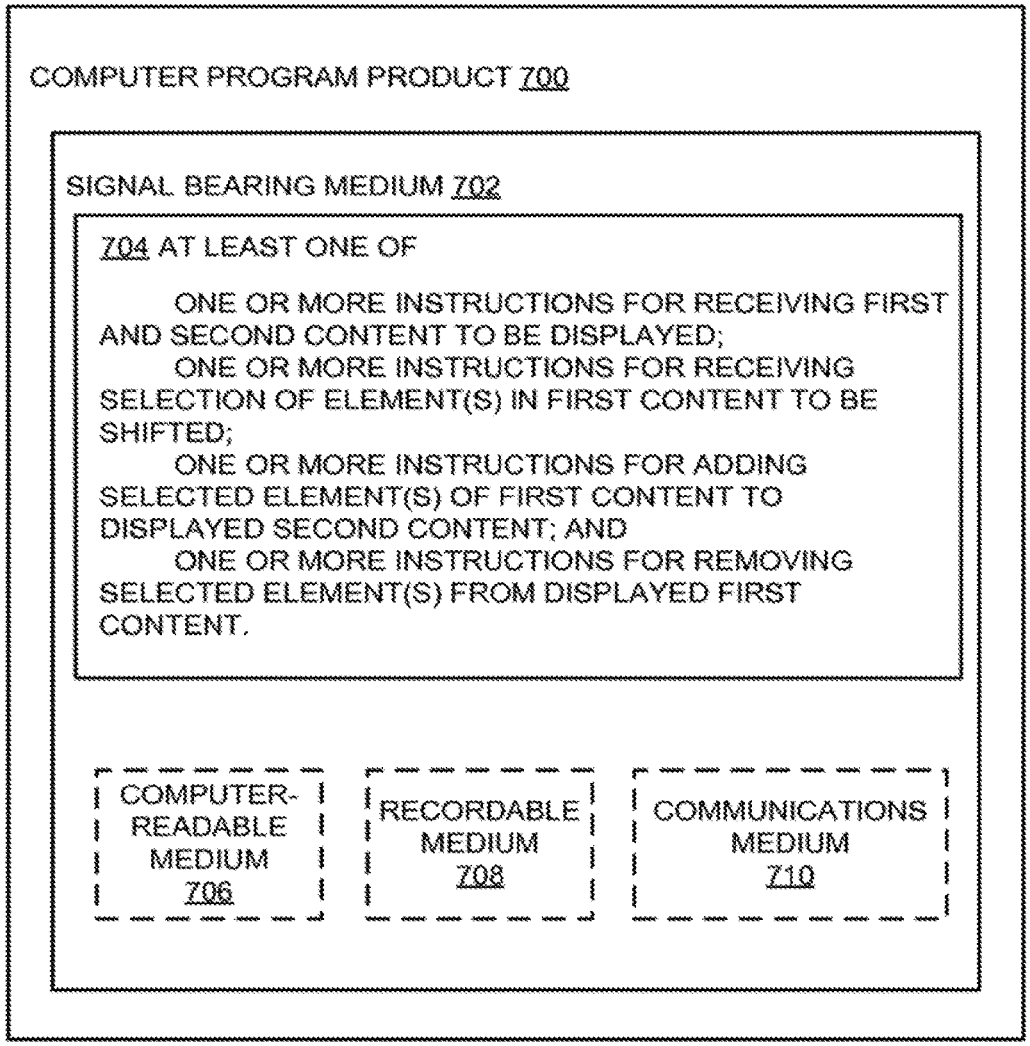
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the interface-shifting application 522 may undertake one or more of the tasks shown in FIG. 7 in response to the instructions 704 conveyed to the processor 504 by the signal bearing medium 702 to perform actions associated with shifting content elements among devices as described herein. Some of those instructions may include, for example, receiving first and second content to be displayed, receiving selection of element(s) in the first content to be shifted, adding the selected element(s) of the first content to the displayed second content, and removing the selected element(s) from the displayed first content, according to some embodiments described herein.

In some implementations, the signal bearing medium 702 depicted in FIG. 7 may encompass a computer-readable medium 706, such as, but not limited to, a hard disk drive (HDD), a solid state drive (SSD), a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method for distributing content elements among devices may include receiving first and second content, receiving an indication of a selection of a content element in the first content from a first device, inserting the selected content element into the second content, and providing the second content having the selected content element to be rendered through a second device.

According to some embodiments, the method may further include receiving the first and second content at a gateway, where the gateway may be a home router, a facility network hub, and/or an Internet service provider (ISP) server. The method may also include receiving the indication via a web application, a web page, and/or a plug-in served by the gateway, and/or removing the selected content element from the first content. The first device may be a smartphone, a tablet computer, a laptop computer, a mobile computer, a handheld computer, a desktop computer, or a wearable computer. The second device may be a television, a wall display, a projector, a standalone monitor, a smartphone, a tablet computer, a laptop computer, a mobile computer, a handheld computer, a desktop computer, or a wearable computer.

According to other embodiments, the method may further include isolating the selected content element in the first content. Isolating the selected content element may include rendering the first content having the selected content element internally at a gateway and determining a portion of the first content to be removed, where the removal does not damage the selected content element. The method may further include determining the portion of the first content to be removed by decomposing the first content into a hierarchical tree and/or based on a probability of need and/or a priority of removal associated with the portion of the first content to be removed. The method may also include maintaining a single session with a source of the first content and/or receiving the first content from the Internet. The content element may be a button, a slider, a toggle, an input field, a scroll bar, a hyperlink, a menu, a textbox, a spinner, a radio button, a checkbox, and/or an edit surface.

According to other examples, a system for distributing content elements among devices may include a gateway and a renderer. The gateway may be configured to receive first and second content, receive an indication of a selection of a content element in the first content from a first device, insert the selected content element into the second content, and provide the second content having the selected content element. The renderer may be part of the second device and configured to receive the second content having the selected content element and render the received second content on a second device.

According to some embodiments, the gateway may be a home router, a facility network hub, and/or an Internet service provider (ISP) server. The gateway may be further configured to remove the selected content element from the first content and/or to serve a web application, a web page, and/or a plug-in to the first device for selecting the content element in the first content. The second device may be a television, a wall display, a projector, a standalone monitor, a smartphone, a tablet computer, a laptop computer, a mobile computer, a handheld computer, a desktop computer, or a wearable computer.

According to other embodiments, the gateway may be further configured to isolate the selected content element in the first content. The gateway may be further configured to deliver the first content having the selected content element internally and determine a portion of the first content to be removed, where the removal does not damage the selected content element. The gateway may be further configured to determine the portion of the first content to be removed by decomposing the first content into a hierarchical tree and/or based on a probability of need and/or a priority of removal associated with the portion of the first content to be removed. The gateway may also be configured to maintain a single session with a source of the first content and/or receive the first content from the Internet. The content element may be a button, a slider, a toggle, an input field, a scroll bar, a hyperlink, a menu, a textbox, a spinner, a radio button, a checkbox, and/or an edit surface.

According to further examples, a gateway for distributing content elements among devices may include a communication module and a processor. The gateway may be configured to receive first and second content, receive an indication of a selection of a content element in the first content from a first device, add the selected content element into the second content, and provide the second content having the selected content element to be rendered through a second device.

According to some embodiments, the gateway may be a home router, a facility network hub, and/or an Internet service provider (ISP) server. The processor may be further configured to remove the selected content element from the first content and/or to serve a web application, a web page, and/or a plug-in to the first device for selecting the content element in the first content. The second device may be a television, a wall display, a projector, a standalone monitor, a smartphone, a tablet computer, a laptop computer, a mobile computer, a handheld computer, a desktop computer, or a wearable computer.

According to other embodiments, the processor may be further configured to isolate the selected content element in the first content, maintain a single session with a source of the first content, and/or receive the first content from the Internet. The content element may be a button, a slider, a toggle, an input field, a scroll bar, a hyperlink, a menu, a textbox, a spinner, a radio button, a checkbox, and/or an edit surface.

According to yet further examples, a computer readable medium may store instructions for distributing content elements among devices. The instructions may include receiving first and second content, receiving an indication of a selection of a content element in the first content from a first device, inserting the selected content element into the second content, and providing the second content having the selected content element to be rendered through a second device.

According to some embodiments, the instructions may further include receiving the first and second content at a gateway, where the gateway may be a home router, a facility network hub, and/or an Internet service provider (ISP) server. The instructions may also include receiving the indication via a web application, a web page, and/or a plug-in served by the gateway, and/or removing the selected content element from the first content. The first device may be a smartphone, a tablet computer, a laptop computer, a mobile computer, a handheld computer, a desktop computer, or a wearable computer. The second device may be a television, a wall display, a projector, a standalone monitor, a smartphone, a tablet computer, a laptop computer, a mobile computer, a handheld computer, a desktop computer, or a wearable computer.

According to other embodiments, the instructions may further include isolating the selected content element in the first content. Isolating the selected content element may include delivering the first content having the selected content element internally at a gateway and determining a portion of the first content to be removed, where the removal does not damage the selected content element. The instructions may further include determining the portion of the first content to be removed by decomposing the first content into a hierarchical tree and/or based on a probability of need and/or a priority of removal associated with the portion of the first content to be removed. The instructions may also include maintaining a single session with a source of the first content and/or receiving the first content from the Internet. The content element may be a button, a slider, a toggle, an input field, a scroll bar, a hyperlink, a menu, a textbox, a spinner, a radio button, a checkbox, and/or an edit surface.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to distribute content elements among devices by a gateway, the method comprising:
  receiving a request for a first content from a first device;
  receiving the first content from one or more servers;
  forwarding the first content to the first device to be displayed;
  receiving an indication of a selection of a content element in the first content from the first device;

determining a first portion of the first content to be removed by decomposing the first content based on a probability that the first portion of the first content is required for the selected content element, wherein the first portion of the first content comprises one or more unselected content elements in the first content;

determining whether the selected content element is damaged by removal of the first portion of the first content based on alterations to one or both of an appearance and a functionality associated with the selected content element;

in response to a determination that the selected content element is damaged, restoring the removed first portion of the first content and determining a second portion of the first content to be removed, wherein the second portion of the first content comprises one or more other unselected content elements in the first content;

in response to a determination that the selected content element is not damaged, inserting the selected content element into a second content; and providing the second content having the selected content element to be rendered through one of: the first device, a second device, and both the first device and the second device based on one of: a default parameter maintained by the gateway, a user preference, and/or a content source parameter.

2. The method of claim 1, wherein receiving the indication includes receiving the indication via one of a web application, a web page, and a plug-in served by the gateway.

3. The method of claim 1, further comprising removing the selected content element from the first content.

4. The method of claim 1, wherein determining the first portion of the first content to be removed includes decomposing the first content into a hierarchical tree.

5. The method of claim 1, wherein determining the first portion of the first content to be removed is based on a priority of removal associated with the first portion of the first content to be removed.

6. The method of claim 1, further comprising maintaining a single session with a source of the first content.

7. The method of claim 1, wherein receiving the first content includes receiving the first content from an Internet.

8. A system to distribute content elements among devices, the system comprising:
   a gateway configured to:
      receive a request for a first content from a first device;
      receive the first content from one or more servers within a single session such that the one or more servers perceive the gateway as a single user;
      forward the first content to the first device to be displayed;
      receive an indication of a selection of a content element in the first content from the first device;
      deliver the first content having the selected content element internally within the gateway and determine a portion of the first content to be removed by decomposition of the first content based on a probability that the portion of the first content is required for the selected content element, wherein the portion of the first content comprises one or more unselected content elements in the first content, and the removal of the portion of the first content does not damage the selected content element;
      insert the selected content element into a second content; and
      provide the second content having the selected content element; and
   a renderer that is part of a second device and is configured to:
      receive the second content having the selected content element; and
      render the received second content on the second device to be displayed based on one of: a default parameter maintained by the gateway, a user preference, and/or a content source parameter.

9. The system of claim 8, wherein the gateway includes one of a home router, a facility network hub, and an Internet service provider (ISP) server.

10. The system of claim 8, wherein the gateway is configured to:
   serve one of a web application, a web page, and a plug-in to the first device to select the content element in the first content.

11. The system of claim 8, wherein the gateway is further configured to remove the selected content element from the first content.

12. The system of claim 8, wherein the gateway is configured to determine the portion of the first content to be removed by decomposition of the first content into a hierarchical tree.

13. The system of claim 8, wherein the gateway is configured to determine the portion of the first content to be removed based on a priority of removal associated with the portion of the first content to be removed.

14. The system of claim 8, wherein the selected content element includes one of a button, a slider, a toggle, an input field, a scroll bar, a hyperlink, a menu, a textbox, a spinner, a radio button, a checkbox, and an edit surface.

15. A gateway to distribute content elements among devices, the gateway comprising:
   a communication module communicatively coupled to one or more servers; and
   a processor coupled to the communication module, the processor configured to:
      receive a request for a first content from a first device;
      receive the first content from the one or more servers;
      forward the first content to the first device to be displayed;
      receive an indication of a selection of a content element in the first content from the first device;
      deliver the first content having the selected content element internally within the gateway and determine a first portion of the first content to be removed by decomposition of the first content based on a probability that the first portion of the first content is required for the selected content element, wherein the first portion of the first content comprises one or more unselected content elements in the first content, and the removal of the first portion of the first content does not damage the selected content element;
      determine whether the selected content element is isolated in the first content;
      in response to a determination that the selected content element is not isolated in the first content, determine a second portion of the first content to be removed, wherein the second portion of the first content comprises one or more other unselected content elements in the first content, and the removal of the second portion of the first content does not damage the selected content element;

in response to a determination that the selected content element is isolated in the first content, add the selected content element to a second content; and provide the second content having the selected content element to be rendered through one of: the first device, a second device, and both the first device and the second device based on one of: a default parameter maintained by the gateway, a user preference, and/or a content source parameter.

16. The gateway of claim 15, wherein the gateway includes one of a home router, a facility network hub, and an Internet service provider (ISP) server.

17. The gateway of claim 15, wherein the processor is configured to:

serve, via the communication module, one of a web application, a web page, and a plug-in to the first device to select the content element in the first content.

18. The gateway of claim 15, wherein the processor is further configured to remove the selected content element from the first content.

19. The gateway of claim 15, wherein the processor is further configured to maintain a single session with a source of the first content.

20. The gateway of claim 15, wherein the processor is configured to receive the first content from an Internet.

21. The gateway of claim 15, wherein the selected content element includes one of a button, a slider, a toggle, an input field, a scroll bar, a hyperlink, a menu, a textbox, a spinner, a radio button, a checkbox, and an edit surface.

22. The method of claim 1, further comprising:

determining whether the selected content element is damaged by removal of the second portion of the first content based on alterations to one or both of the appearance and the functionality associated with the selected content element; and in response to a determination that the selected content element is damaged, restoring the removed second portion of the first content, at the gateway, and determining a third portion of the first content to be removed, wherein the third portion of the first content comprises one or more further unselected content elements in the first content.

23. The gateway of claim 15, wherein the processor is further configured to:

after removal of the second portion of the first content, determine whether the selected content element is isolated in the first content; and in response to a determination that the selected content element is not isolated in the first content, determine a third portion of the first content to be removed, wherein the third portion of the first content comprises one or more further unselected content elements in the first content, and the removal of the third portion of the first content does not damage the selected content element.

* * * * *

UNITED STATES PATENT AND TRADEMARK OFFICE
CERTIFICATE OF CORRECTION

PATENT NO. : 9,648,123 B2  Page 1 of 1
APPLICATION NO. : 13/988417
DATED : May 9, 2017
INVENTOR(S) : Kruglick It is certified that error appears in the above-identified patent and that said Letters Patent is hereby corrected as shown below:

In Column 1, Line 8, delete "$371" and insert -- § 371 --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*